(12) United States Patent
Levasalmi et al.

(10) Patent No.: US 9,074,086 B1
(45) Date of Patent: Jul. 7, 2015

(54) POLYOLEFIN COMPOSITION WITH POLY(PHENYLENE ETHER) FILLER AND ARTICLE THEREOF

(71) Applicant: SABIC INNOVATIVE PLASTICS IP B.V., Bergen Op Zoom (NL)

(72) Inventors: Juha-Matti Levasalmi, Delmar, NY (US); Kim G. Balfour, Delanson, NY (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/132,684

(22) Filed: Dec. 18, 2013

(51) Int. Cl.
*C08L 23/12* (2006.01)
*C08L 23/06* (2006.01)

(52) U.S. Cl.
CPC *C08L 23/12* (2013.01); *C08L 23/06* (2013.01)

(58) Field of Classification Search
USPC ............................ 525/68, 95, 905; 264/53, 51
See application file for complete search history.

(56) References Cited

U.S. PATENT DOCUMENTS

| | | | |
|---|---|---|---|
| 3,306,874 | A | 2/1967 | Hay |
| 5,081,187 | A | 1/1992 | Maruyama et al. |
| 5,166,264 | A | 11/1992 | Lee, Jr. et al. |
| 5,262,480 | A | 11/1993 | Lee, Jr. |
| 6,045,883 | A | 4/2000 | Akiyama et al. |
| 6,875,387 | B2 | 4/2005 | Mhetar et al. |
| 2006/0135695 | A1 | 6/2006 | Guo et al. |
| 2011/0184128 | A1 | 7/2011 | Guo et al. |
| 2012/0148817 | A1 | 6/2012 | Riding |

FOREIGN PATENT DOCUMENTS

| | | | | |
|---|---|---|---|---|
| JP | 11-071466 | * | 3/1999 | ................ C08J 3/20 |
| JP | H11071466 | | 3/1999 | |
| JP | 2009-149795 | * | 7/2009 | .............. C08L 23/10 |
| JP | 2009149795 | | 7/2009 | |
| JP | 2011-184598 | * | 9/2011 | .............. C08L 23/04 |
| JP | 2011184598 | | 9/2011 | |

OTHER PUBLICATIONS

EP0962496 A1, Dec. 18, 1999, Abstract Only, 2 pages.
International Search Report for International Application No. PCT/US2014/066352, International filing date Nov. 19, 2014, Date of mailing Mar. 27, 2015, 4 pages.
Written Opinion for International Application No. PCT/US2014/066352, International filing date Nov. 19, 2014, Date of mailing Mar. 27, 2015, 4 pages.

* cited by examiner

*Primary Examiner* — Robert Harlan
(74) *Attorney, Agent, or Firm* — Cantor Colburn LLP (57) ABSTRACT

Polyolefin compositions having improved properties comprise oligomeric poly(phenylene ether) as an organic filler. The composition comprises specific amounts of polyolefin, oligomeric poly(phenylene ether), and optionally a compatibilizer. The polyolefin can be a polyethylene homopolymer, an ethylene-containing copolymer, a polypropylene homopolymer, a polypropylene-containing copolymer, or a combination thereof. The oligomeric poly(phenylene ether) can be monofunctional or bifunctional. The compositions can have increased flexural modulus, heat deformation resistance, and flame resistance, compared to compositions without the oligomeric poly(phenylene ether). A compatibilizer can partially restore elongation when high levels of oligomeric poly(phenylene ether) are present.

22 Claims, 2 Drawing Sheets

POLYOLEFIN COMPOSITION WITH POLY(PHENYLENE ETHER) FILLER AND ARTICLE THEREOF

BACKGROUND OF THE INVENTION

Polyethylene is a versatile and inexpensive plastic that is used in the highest volume of any plastic. Polyethylene has toughness, near zero moisture absorption, excellent electrical insulating properties, low coefficient of friction, and is easily processed. Specialty grades of polyethylene include low density polyethylene (LDPE), medium density (MDPE), and many others. For example, LDPE is used in food packaging film, including stretch and shrink wrap; for plastic bags such as grocery bags, laundry and dry cleaning bags; for extruded wire and cable insulation; and for bottles, closures, and toys.

Polyethylene is not a high-performance plastic. Polyethylene, which is semi-crystalline, has a low glass transition temperature and crystalline melting point. Therefore it tends to lose its mechanical properties above its glass transition temperature. For example, polyethylene can have a low heat deflection temperature. Thus polyethylene has a low practical end use temperature. Some of the performance deficiencies of polyethylene can be addressed by the replacement of all of part of the polyethylene with polypropylene. However, polypropylene has poor UV stability, and UV stabilizers must be used for outdoor applications. Some of the performance deficiencies of polyethylene can also be addressed by the use of inorganic fillers. However the use of inorganic fillers leads to increases in specific gravity and adversely affects melt flow properties, elongation, and impact strength.

Poly(phenylene ether) (PPE) can be utilized as an organic filler for polyethylene and other polyolefins. Poly(phenylene ether) is a plastic having excellent water resistance, dimensional stability, and inherent flame retardancy, as well as high oxygen permeability and oxygen/nitrogen selectivity. Properties such as strength, flexural modulus, and heat deformation resistance of polyolefins can be improved by blending them with poly(phenylene ether)s, which serve as organic fillers, so that the compositions meet the requirements of various consumer products, for example plumbing fixtures, electrical boxes, and automotive parts. However, other properties, such as elongation, impact strength, and melt flow, can be adversely affected by blending poly(phenylene ether)s with polyolefins. Therefore, there remains a need for polyolefin molding compositions having increased heat deformation resistance, flexural modulus, and flame resistance, without sacrificing other physical properties. In particular, it is desirable that increased heat deformation resistance, flexural modulus, and flame resistance be obtained without adversely affecting elongation, impact strength, melt flow, density, and UV stability.

BRIEF DESCRIPTION OF THE INVENTION

In one embodiment, a composition comprises 65 to 97.5 weight percent of a polyolefin; 2.5 to 25 weight percent of an oligomeric poly(phenylene ether) having an intrinsic viscosity of 0.01 to 0.15 deciliters per gram, as measured in chloroform at 25° C.; and 0 to 10 weight percent of a compatibilizer; wherein all weight percents are based on the combined weight of the polyolefin, the poly(phenylene ether), and the compatibilizer.

In a more specific embodiment, a composition comprises 65 to 97.5 weight percent of a polyolefin selected from low density polyethylene, medium density polyethylene, and a combination thereof; 2.5 to 25 weight percent of an oligomeric poly(phenylene ether) having an intrinsic viscosity of 0.01 to 0.12 deciliters per gram, as measured in chloroform at 25° C., selected from monofunctional poly(2,6-dimethyl-4-phenylene ether), bifunctional poly(2,6-dimethyl-4-phenylene ether), and a combination thereof; and 0 to 10 weight percent of a polystyrene-poly(ethylene-butylene)-polystyrene triblock copolymer comprising 20 to 60 weight percent polystyrene content, based on the weight of the triblock copolymer, and having a weight average molecular weight of 50,000 to 100,000 atomic mass units, based on gel permeation chromatography; wherein all weight percents are based on the combined weight of the polyolefin, the poly(phenylene ether), and the polystyrene-poly(ethylene-butylene)-polystyrene triblock copolymer.

Other embodiments are articles comprising the foregoing compositions.

These and other embodiments are described in detail below.

DETAILED DESCRIPTION OF THE INVENTION

The present inventors have determined that the mechanical, thermal, rheological, and flammability properties of polyolefins can be improved by the addition of specific amounts of an oligomeric poly(phenylene ether) to the polyolefin. In particular, flexural modulus and heat deformation resistance can be improved. However elongation and impact strength can be adversely affected. These effects, especially increased flexural modulus, are more pronounced in oligomeric poly(phenylene ether)-polyethylene blends than in oligomeric poly(phenylene ether)-polypropylene blends. Moreover, the improvements in heat deformation resistance, flexural modulus, and strength are more pronounced in oligomeric poly(phenylene ether)-polyethylene blends than in high molecular weight poly(phenylene ether)-polyethylene blends. In addition to a filler effect, it is postulated that oligomeric species in the poly(phenylene ether)s can contribute to these improvements by nucleation of the polyolefin. The inventors have also determined that ignition of polyolefins can be delayed by addition of oligomeric poly(phenylene ether), and that the capillary viscosity of polyolefin melts can be decreased by the addition of oligomeric poly(phenylene ether), which can result in improved processing (extrusion and molding).

These improvements are achieved by a composition comprising 65 to 97.5 weight percent of a polyolefin; 2.5 to 25 weight percent of an oligomeric poly(phenylene ether) having an intrinsic viscosity of 0.01 to 0.12 deciliters per gram, as measured in chloroform at 25° C.; and 0 to 10 weight percent of a compatibilizer; wherein all weight percents are based on the combined weight of the polyolefin, the poly(phenylene ether), and the compatibilizer.

The composition comprises a polyolefin. Examples of polyolefins comprise polyethylenes, including high density polyethylene (HDPE), low density polyethylene (LDPE), medium density polyethylene (MDPE), and linear low density polyethylene (LLDPE), polypropylenes, including atactic, syndiotactic, and isotactic polypropylenes, polybutene-1 (PB-1), copolymers of ethylene and/or propylene with other olefins, and combinations thereof.

The polyolefin can comprise polyethylene. Polyethylenes are lightweight, semicrystalline thermoplastics that are prepared by the catalytic polymerization of ethylene. Depending on the temperature, pressure, catalyst, and the use of a co-monomer, three basic types of polyethylene can be produced: high-density polyethylene (HDPE), low-density polyethylene (LDPE), and linear low-density polyethylene (LLDPE). LDPE and LLDPE are branched. The branching results in decreased crystallinity and lower density. Most properties of polyethylenes are a function of their density and molecular weight. As density decreases, the strength, modulus, and hardness decrease, and flexibility, impact, and clarity increase. Hence HDPE exhibits greater flexural modulus, rigidity, improved heat deformation resistance, and increased resistance to permeability than LDPE and LLDPE.

LDPE is prepared at high temperatures and pressures, which results in complex branched molecular structures. The amount of branching and the density can be controlled by the polymerization conditions. LLDPE is prepared by using an α-olefin co-monomer during polymerization. Hence branching is introduced in a controlled manner, and the branch chain length is uniform. In general, the co-monomers comprise 1-butene, 1-hexene, 1-octene, and 4-methyl-1-pentene (4M1P). Specialty grades of polyethylene include very low density (VLDPE), medium density (MDPE), and ultra-high molecular weight polyethylene (UHMWPE).

The polyolefin can comprise polypropylene (PP). Polypropylenes are semicrystalline thermoplastics, and have improved properties over HDPE. Polypropylenes are prepared by the catalytic polymerization of propylene. Crystallinity is a key property of polypropylene. The degree of crystallinity is a function of the geometric orientation of the methyl groups on the polymer chain (backbone). There are three possible geometric (stereoisomeric) forms of polypropylene—isotactic, syndiotactic, and atactic. The geometric form of the polypropylene is referred to as "tacticity". In isotactic polypropylene, the methyl groups are predominantly aligned on the same side of the polymer backbone. In syndiotactic polypropylene, the methyl groups have alternating configurations relative to the polymer backbone. In atactic polypropylene, the methyl groups are randomly positioned along the polymer backbone. The tacticity of polypropylene can have a significant effect on physical properties. For example, the melting points of isotactic polypropylene, syndiotactic polypropylene, and atactic polypropylene are 160-170° C., 125-131° C., and none, respectively.

Isotactic polypropylene is highly crystalline, and exhibits low density, rigidity, good chemical resistance to hydrocarbons, alcohols and oxidizing agents, negligible water absorption, excellent electrical properties, and high flexural modulus. For example, polypropylene has the highest flexural modulus of the commercially available polyolefins. However, polypropylene has poor impact resistance. Polypropylene-elastomer blends have improved impact strength. Unfilled polypropylene has poor flame resistance, and requires the use of flame retardants in certain applications.

Both isotactic and syndiotactic polypropylene will crystallize when cooled from molten states. There are three important crystalline morphologies of isotactic polypropylene. Physical properties of isotactic polypropylene can be controlled to some extent by varying the relative amounts of these crystalline phases. Syndiotactic polypropylene has very different crystalline morphology, and a different balance of flexural modulus and toughness. In general, syndiotactic polypropylene is less crystalline and exhibits greater clarity, elasticity, and impact resistance than other forms. Nucleating agents can control the crystal morphology.

Some control of the tacticity of polypropylene can be achieved by the choice of polymerization catalyst. The classic catalysts are Ziegler-Natta catalysts. However, newer metallocene catalysts offer much greater control over tacticity than Ziegler-Natta catalysts. The proper choice of catalyst can produce isotactic, syndiotactic, atactic polypropylene, or a combination of these. Polypropylene thermoplastic elastomers can be obtained when isotactic blocks alternate with atactic blocks. Polypropylene can be copolymerized with ethylene and/or higher α-olefins.

The polyolefin can comprise a polyolefin block copolymer comprising an end group consisting essentially of a polyolefin homopolymer of $C_2$ to $C_3$ olefins and a middle block comprising a copolymer of $C_2$ to $C_{12}$ olefins. The polyolefin can also comprise a combination of homopolymer and copolymer, a combination of homopolymers having different melt temperatures, and/or a combination of homopolymers having different melt flow rates.

The polyolefin can comprise polybutene-1. Polybutene-1, also referred to as polybutylene, poly(1-butene), and PB-1, can be produced by polymerization of 1-butene using supported Ziegler-Natta catalysts. Polybutene-1 is a high molecular weight, linear, isotactic, and semi-crystalline polymer. Isotactic polybutene-1 exhibits a $T_m$ of about 110-140° C. and a $T_g$ of about −17° C. Polybutene-1 is a flexible, linear polyolefin that can be a homopolymer of 1-butene or a copolymer with ethylene. Polybutene-1 combines physical properties of other polyolefins with excellent creep resistance, heat deformation resistance, and resistance to environmental stress cracking. It can also be used in combination with other polyolefins, for example, polyethylene and polypropylene.

The polyolefin can also comprise a random copolymer of ethylene with a polar monomer, for example vinyl acetate (EVA), methyl acrylate, ethyl acrylate (EEA), butyl acrylate, acrylic acid (EAA), maleic anhydride, glycidyl methacrylate (GMA), and a combination thereof.

In some embodiments, the polyolefin comprises a polyethylene homopolymer, an ethylene-containing copolymer, a polypropylene homopolymer, a polypropylene-containing copolymer, or a combination thereof and in particular a polyethylene homopolymer, an ethylene-containing copolymer, or a combination thereof. In some embodiments, the polyolefin comprises low density polyethylene, very low density polyethylene, linear low density polyethylene, medium density polyethylene, high density polyethylene, ethylene-propylene copolymer, ethylene-vinyl acetate copolymer, or a combination thereof. In some embodiments, the polyolefin comprises a polyethylene homopolymer, and in particular low density polyethylene, medium density polyethylene, high density polyethylene, or a combination thereof. The composition can comprise 65 to 97.5 weight percent, and specifically 70 to 95 weight percent, of the polyolefin, based on the combined weight of the polyolefin, the poly(phenylene ether), and the compatibilizer.

The composition further comprises an oligomeric poly(phenylene ether). Examples of oligomeric poly(phenylene ether)s include those comprising repeating structural units having the formula wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is specifically described as substituted, it can contain heteroatoms other than the carbon and hydrogen members of the substituent residue. Thus, when described as substituted, the hydrocarbyl residue contains one or more heteroatoms such as a halogen, oxygen, nitrogen, sulfur, phosphorus, or silicon. When specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a 3,5-dimethyl-1,4-phenyl group with the di-n-butylamine component of an oxidative polymerization catalyst. As another example, $Z^1$ can be a morpholinomethyl group formed by reaction of a 3,5-dimethyl-1,4-phenyl group with the morpholine component of an oxidative polymerization catalyst.

The oligomeric poly(phenylene ether) can be a homopolymer, a copolymer, a graft copolymer, an ionomer, a block copolymer, or a combination thereof. The oligomeric poly(phenylene ether) can comprise, for example 2,6-dimethyl-1,4-phenylene ether repeating units, 2,3,6-trimethyl-1,4-phenylene ether repeating units, or a combination thereof. The oligomeric poly(phenylene ether) can be monofunctional or bifunctional. The oligomeric poly(phenylene ether) can be monofunctional. For example, it can have a functional group at one terminus of the polymer chains. The functional group can be, for example, a hydroxyl group or a (meth)acrylate group. In some embodiments, the oligomeric poly(phenylene ether) comprises poly(2,6-dimethyl-1,4-phenylene ether). An example of a monofunctional oligomeric poly(2,6-dimethyl-1,4-phenylene ether) is NORYL™ SA120, available from SABIC Innovative Plastics.

The oligomeric poly(phenylene ether) can be bifunctional. For example, it can have functional groups at both termini of the polymer chain. The functional groups can be, for example, hydroxyl groups or (meth)acrylate groups. Bifunctional polymers with functional groups at both termini of the polymer chains are also referred to as "telechelic" polymers. In some embodiments, the oligomeric poly(phenylene ether) comprises a bifunctional poly(phenylene ether) having the structure wherein $Q^1$ and $Q^2$ are each independently selected from the group consisting of halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to 30, specifically 0 to 20, more specifically 0 to 15, still more specifically 0 to 10, even more specifically 0 to 8, provided that the sum of x and y is at least 2, specifically at least 3, more specifically at least 4; and L has the structure wherein each occurrence of $R^1$ and $R^2$ and $R^3$ and $R^4$ is independently selected from the group consisting of hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group.

In the hydroxy-terminated poly(phenylene ether) structure above, there are limitations on the variables x and y, which correspond to the number of phenylene ether repeating units at two different places in the bifunctional poly(phenylene ether) oligomer. In the structure, x and y are independently 0 to 30, specifically 0 to 20, more specifically 0 to 15, even more specifically 0 to 10, yet more specifically 0 to 8. The sum of x and y is at least 2, specifically at least 3, more specifically at least 4. An oligomeric poly(phenylene ether) can be analyzed by proton nuclear magnetic resonance spectroscopy ($^1$H NMR) to determine whether these limitations are met, on average. Specifically, $^1$H NMR can distinguish between protons associated with internal and terminal phenylene ether groups, with internal and terminal residues of a polyhydric phenol, and with terminal residues as well. It is therefore possible to determine the average number of phenylene ether repeating units per molecule, and the relative abundance of internal and terminal residues derived from dihydric phenol.

In some embodiments the oligomeric poly(phenylene ether) comprises a bifunctional poly(phenylene ether) having the structure wherein each occurrence of $Q^5$ and $Q^6$ is independently methyl, di-n-butylaminomethyl, or morpholinomethyl; and each occurrence of a and b is independently 0 to 20, with the proviso that the sum of a and b is at least 2. Examples of bifunctional poly(phenylene ether)s include NORYL™ SA90, and SA9000, both available from SABIC Innovative Plastics.

In some embodiments, the composition comprises 65 to 97.5 weight percent of a bifunctional poly(phenylene ether) having the structure wherein each occurrence of $Q^5$ and $Q^6$ is independently methyl, di-n-butylaminomethyl, or morpholinomethyl; and each occurrence of a and b is independently 0 to 20, with the proviso that the sum of a and b is at least 2; 2.5 to 25 weight percent of a polyolefin comprising polyethylene homopolymer; and 0 to 10 weight percent of a compatibilizer; wherein all weight percents are based on the combined weight of the polyolefin, the poly(phenylene ether), and the compatibilizer.

The oligomeric poly(phenylene ether) can comprise poly(phenylene ether) rearrangement products, such as bridging products and branching products. For example, poly(2,6-dimethyl-1,4-phenylene ether) can comprise the bridging fragment below:

This branching fragment is referred to herein as an "ethylene bridge group". As another example, poly(2,6-dimethyl-1,4-phenylene ether) can comprise the branching fragment below:

This branching fragment is referred to herein as a "rearranged backbone group". These fragments can be identified and quantified by $^{31}$P nuclear magnetic resonance spectroscopy after phosphorus derivatization of the hydroxyl groups.

The oligomeric poly(phenylene ether) can be essentially free of incorporated diphenoquinone residues. In the context, "essentially free" means that the fewer than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) chain) by heating the polymerization reaction mixture to yield a poly(phenylene ether) comprising terminal or internal diphenoquinone residues. For example, as shown in the Scheme below, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of diphenoquinone.

Scheme terminal diphenoquinone residue internal diphenoquinone residue

However, such reequilibration reduces the molecular weight of the poly(phenylene ether) (e.g., p and q+r are less than n). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

The oligomeric poly(phenylene ether) can have an intrinsic viscosity of 0.01 to 0.15 deciliter per gram, as measured at 25° C. in chloroform. Within this range, the oligomeric poly(phenylene ether) can have an intrinsic viscosity of 0.05 to 0.15 deciliter per gram, more specifically 0.09 to 0.12 deciliter per gram. In some embodiments, the oligomeric poly(phenylene ether) has a weight average molecular weight of 1,000 to 10,000 atomic mass units, specifically 1,200 to 8,000 atomic mass units, as measured by gel permeation chromatography. The inventors have determined that when the intrinsic viscosity and weight average molecular weight of the oligomeric poly(phenylene ether) are in these ranges, the magnitude of the increases in flexural modulus and heat deformation resistance are more pronounced compared to polyolefin compositions comprising higher intrinsic viscosity and weight average molecular weight poly(phenylene ether)s.

The composition can comprise 2.5 to 25 weight percent, specifically 5 to 20 weight percent, and more specifically 5 to 15 weight percent, of the oligomeric poly(phenylene ether), based on the combined weight of the polyolefin, the poly(phenylene ether), and the compatibilizer.

Figure 1:
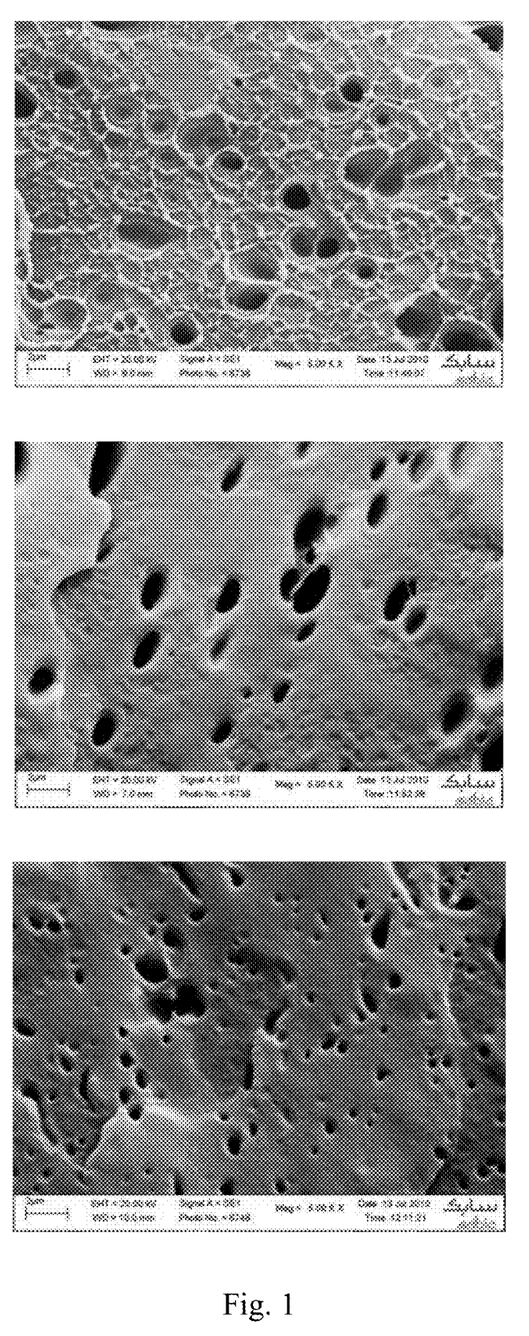
FIG. 1 depicts scanning electron microscopy (SEM) images of 90/10 MDPE/PPE blends after microtoming and toluene extraction. Different poly(phenylene ether)s were used: 10 weight percent PPE 0.33 (top, Example 44); 10 weight percent SA120 (center, Example 47); and 10 weight percent SA90 (bottom, Example 11).
Figure 2:
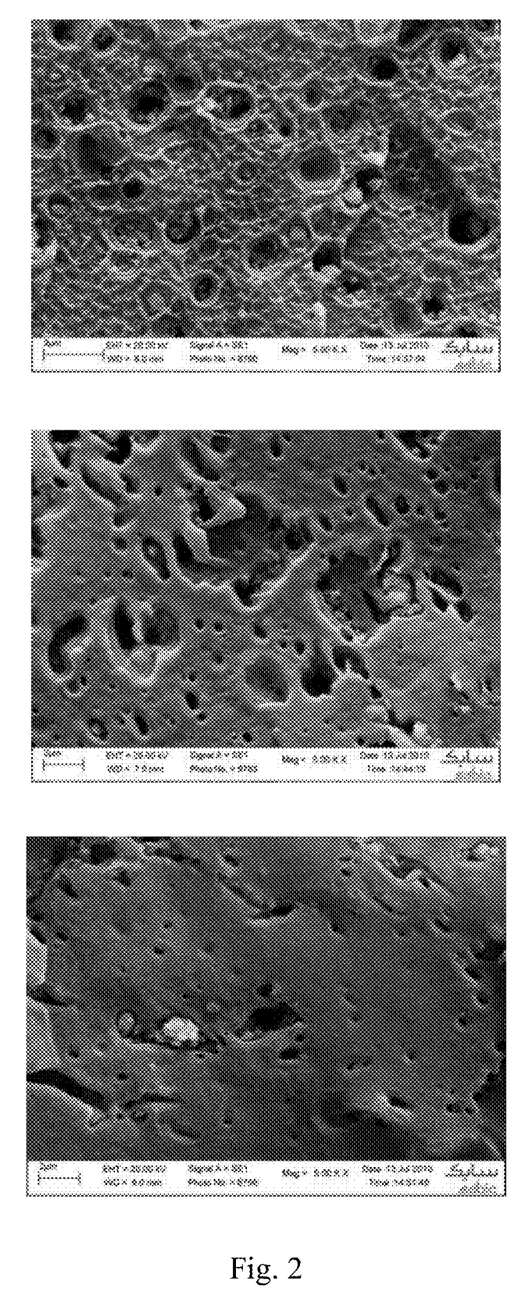
FIG. 2 depicts SEM images of 80/10/10 MDPE/PPE/MDH blends after microtoming and toluene extraction. Different poly(phenylene ether)s were used: 10 weight percent PPE 0.33 (top); 10 weight percent SA120 (center, Example 42); and 10 weight percent SA90 (bottom).

When the poly(phenylene ether) is immiscible and not compatible with the polyolefin, the composition can comprise a continuous phase comprising the polyolefin, and a disperse phase comprising the oligomeric poly(phenylene ether). FIGS. 1 and 2 are SEM images of microtomed slices of polyolefin/oligomeric poly(phenylene ether) blends which were extracted with toluene. Since oligomeric poly(phenylene ether)s are soluble in toluene, the cavities represent domains that formerly contained oligomeric poly(phenylene ether). The matrix is the continuous polyolefin phase. Thus the oligomeric poly(phenylene ether) serves as an organic filler for the polyolefin.

The composition optionally further comprises a compatibilizer. The inventors have determined that at high levels of oligomeric poly(phenylene ether), the compatibilizer can mitigate any decrease in elongation associated with the presence of oligomeric poly(phenylene ether). The compatibilizer can be a block copolymer comprising blocks compatible with the oligomeric poly(phenylene ether) and blocks compatible with the polyolefin. Thus, in some embodiments, the compatibilizer can comprise a hydrogenated, partially hydrogenated, or non-hydrogenated block copolymer of an alkenyl aromatic compound and a conjugated diene, or a combination thereof. For brevity, these copolymers are herein referred to collectively as "block copolymers".

The alkenyl aromatic monomer used to prepare the block copolymer can have the structure wherein $R^7$ and $R^8$ each independently represent a hydrogen atom, a $C_1$-$C_8$ alkyl group, or a $C_2$-$C_8$ alkenyl group; $R^9$ and $R^{13}$ each independently represent a hydrogen atom, a $C_1$-$C_8$ alkyl group, a chlorine atom, or a bromine atom; and $R^{10}$, $R^{11}$, and $R^{12}$ each independently represent a hydrogen atom, a $C_1$-$C_8$ alkyl group, or a $C_2$-$C_8$ alkenyl group, or $R^{10}$ and $R^{11}$ are taken together with the central aromatic ring to form a naphthyl group, or $R^{11}$ and $R^{12}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. A combination of alkenyl aromatic monomers can be used. In some embodiments, the alkenyl aromatic monomer comprises styrene.

The conjugated diene used to prepare the block copolymer can be a $C_4$-$C_{20}$ conjugated diene. Specific conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and a combination thereof. In some embodiments, the conjugated diene is 1,3-butadiene, 2-methyl-1,3-butadiene, or a combination thereof. In some embodiments, the conjugated diene consists of 1,3-butadiene.

The block copolymer is a copolymer comprising at least one block derived from an alkenyl aromatic compound (A) and at least one block derived from a conjugated diene (B). The arrangement of blocks (A) and (B) includes a linear structure, a grafted structure, and a radial teleblock structure with or without a branched chain. Linear block copolymers include tapered linear structures and non-tapered linear structures. The block copolymer can have a tapered linear structure or a non-tapered linear structure. The hydrogenated block copolymer can comprise a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the block copolymer comprises a diblock copolymer, a triblock copolymer, or a combination thereof.

The block copolymer can exclude residues of monomers other than the alkenyl aromatic compound and the conjugated diene. Thus, the block copolymer can consist of blocks derived from the alkenyl aromatic compound and blocks derived from the conjugated diene. In some embodiments, the block copolymer does not comprise grafts formed from these or any other monomers. The block copolymer can consist of carbon and hydrogen atoms and therefore excludes heteroatoms. The block copolymer can include the residues of one or more acid functionalizing agents, such as maleic anhydride. Methods for preparing block copolymers are known in the art and many block copolymers are commercially available.

The aliphatic unsaturated group content in the block (B) can be hydrogenated, partially hydrogenated, or non-hydrogenated. The hydrogenated block copolymers have better ultraviolet (UV) stability than non-hydrogenated block copolymers. Thus, it can be advantageous to use hydrogenated block copolymers in parts that are exposed to sunlight. The hydrogenated and partially hydrogenated block copolymers can comprise aliphatic unsaturation in the (B) block that is reduced by at least 50 percent, specifically at least 70 percent, more specifically at least 80 percent, still more specifically at least 90 percent, and yet more specifically at least 95 percent, compared to the same block copolymer that is non-hydrogenated.

Illustrative commercially available hydrogenated block copolymers include the polystyrene-poly(ethylene-propylene) diblock copolymers available from Kraton Polymers as KRATON™ G1701 (having 37 weight percent polystyrene) and G1702 (having 28 weight percent polystyrene); the polystyrene-poly(ethylene-butylene)-polystyrene (SEBS) triblock copolymers available from Kraton Polymers as KRATON™ G1641 (having 34 weight percent polystyrene), G1651 (having 31-33 weight percent polystyrene), and G1654 (having 31 weight percent polystyrene); and the polystyrene-poly(ethylene-ethylene/propylene)-polystyrene triblock copolymers available from Kuraray as SEPTON™ 54044, S4055, S4077, and S4099. Additional commercially available hydrogenated block copolymers include polystyrene-poly(ethylene-butylene)-polystyrene (SEBS) triblock copolymers available from Dynasol as CALPRENE™ CH-6170, CH-7171, CH-6174 and CH-6140; from Kuraray as SEPTON™ 8006 and 8007; and from Asahi as TUFTEC™ H1051; polystyrene-poly(ethylene-propylene)-polystyrene (SEPS) copolymers available from Kuraray as SEPTON™ 2006 and 2007; and oil-extended compounds of these hydrogenated block copolymers available from Kraton Polymers as KRATON™ G4609 and G4610 and from Asahi as TUFTEC™ H1272. Mixtures of two of more hydrogenated block copolymers can be used.

The styrenic copolymer can also be a non-hydrogenated block copolymer. Non-hydrogenated block copolymers are similar to hydrogenated block copolymers, except the residual aliphatic unsaturation in the poly(conjugated diene) blocks is not reduced by hydrogenation. Specific unhydrogenated block copolymers include polystyrene-polybutadiene-polystyrene triblock copolymers (SBS), polystyrene-polyisoprene-polystyrene triblock copolymers (SIS), polystyrene-polybutadiene diblock copolymers (SB), polystyrene-polyisoprene diblock copolymers (SI), and combinations thereof.

In some embodiments, the composition comprises 0.5 to 10 weight percent of a compatibilizer comprising a polystyrene-poly(ethylene-butylene)-polystyrene triblock copolymer, a polystyrene-poly(ethylene-propylene)-polystyrene triblock copolymer, a polystyrene-poly(ethylene-ethylene/propylene)-polystyrene triblock copolymer, a polystyrene-poly(butadiene-styrene)polystyrene triblock copolymer, a polystyrene-polyisoprene-polystyrene triblock copolymer, a polystyrene-polybutadiene-polystyrene triblock copolymer (SBS), a polystyrene-polyisoprene-polystyrene triblock copolymer (SIS), a polystyrene-polybutadiene diblock copolymer (SB), a polystyrene-polyisoprene diblock copolymer (SI), or a combination thereof.

The composition can comprise 0 to 10 weight percent, specifically 0.5 to 10 weight percent, more specifically 0.5 to 7.5 weight percent, and still more specifically, 1 to 5 weight percent, of the compatibilizer, based on the combined weight of the polyolefin, the poly(phenylene ether), and the compatibilizer. In some embodiments, the compatibilizer comprises 0.5 to 10 weight percent of a hydrogenated, partially hydrogenated, and/or non-hydrogenated block copolymer of an alkenyl aromatic compound and a conjugated diene, or a combination thereof.

In some embodiments, the composition comprises 0.5 to 10 weight percent, based on the combined weight of the polyolefin, the poly(phenylene ether), and the hydrogenated block copolymer, of polystyrene poly(ethylene-butylene)-polystyrene triblock copolymer comprising 20 to 60 weight percent polystyrene, based on the weight of the triblock copolymer, and having a weight average molecular weight of 50,000 to 100,000 atomic mass units, as measured by gel permeation chromatography.

The compatibilizer can be minimized or excluded from the composition. For example, the compatibilizer can be excluded when the amount of poly(phenylene ether) is less than 20 weight percent, specifically less than 10 weight percent, and more specifically, less than 5 weight percent, based on the combined weight of the polyolefin, the poly(phenylene ether), and the compatibilizer. Thus in some embodiments, the composition comprises 0 to less than 1 weight percent, specifically 0 to less than 0.5 weight percent, more specifically 0 to less than 0.25 weight percent, and yet more specifically, 0 to less than 0.1 weight percent, based on the combined weight of the polyolefin, the poly(phenylene ether), and the compatibilizer, of the compatibilizer, wherein the compatibilizer comprises a hydrogenated, partially hydrogenated, or a non-hydrogenated block copolymer of an alkenyl aromatic compound and a conjugated diene, or a combination thereof. In some embodiments, the compatibilizer is excluded from the composition.

The composition can optionally further comprise a polytetrafluoroethylene. In some embodiments, the polytetrafluoroethylene (PTFE) is encapsulated in styrene-acrylonitrile copolymer (SAN) to form poly(styrene-acrylonitrile)-encapsulated PTFE. Poly(styrene-acrylonitrile)-encapsulated polytetrafluoroethylene can be made by polymerizing styrene and acrylonitrile in the presence of polytetrafluoroethylene. The poly(styrene-acrylonitrile)-encapsulated polytetrafluoroethylene can comprise 30 to 70 weight percent polytetrafluoroethylene and 30 to 70 weight percent poly(styrene-acrylonitrile), based on the weight of the poly(styrene-acrylonitrile)-encapsulated polytetrafluoroethylene. In some embodiments, the encapsulating poly(styrene-acrylonitrile) comprises 50 to 90 weight percent styrene residues, and 10 to 50 weight percent acrylonitrile residues. The polytetrafluoroethylene can be present in an amount of 0.02 to 1 weight percent, specifically 0.04 to 0.7 weight percent, and more specifically 0.05 to 0.5 weight percent, based on the total weight of the composition. Advantageously, the inventors have determined that the polytetrafluoroethylene can delay dripping in UL-94 testing. Thus, in some embodiments, the composition comprises 0.02 to 1 weight percent, based on the total weight of the composition, of a polytetrafluoroethylene.

Polyolefins are flammable materials. Flame retardants can be added to reduce the flammability of the polyolefin compositions. In some embodiments, the flame retardant comprises a metal hydroxide, a phosphoric acid salt, an organophosphate ester, a brominated organic compound, antimony trioxide, or a combination thereof. In some embodiments, the composition comprises 1 to 60 weight percent, based on the total weight of the composition, of a flame retardant.

The flame retardant can be a metal hydroxide. The metal hydroxide includes all metal hydroxides exhibiting fire retardance, as well as combinations thereof. The metal hydroxide can be chosen to have substantially no decomposition during processing of the composition. Substantially no decomposition is defined herein as amounts of decomposition that do not substantially reduce the flame retardance that would otherwise be obtained. Exemplary metal hydroxides include, but are not limited to, magnesium hydroxide (CAS No. 1309-42-8), aluminum hydroxide (CAS No. 21645-51-2), and a combination thereof. In some embodiments, the metal hydroxide comprises magnesium hydroxide. The metal hydroxide has an average particle size less than or equal to 10 micrometers and/or a purity greater than or equal to 90 weight percent. It can be desirable for the metal hydroxide to contain substantially no water, i.e. to have a weight loss of less than 1 weight percent upon drying at 120° C. for 1 hour. The metal hydroxide can be coated, for example, with stearic acid or other fatty acid.

The composition can comprise 5 to 50 weight percent, specifically 10 to 50 weight percent, and more specifically 20 to 50 weight percent, of the metal hydroxide, based on the total weight of the composition. Since poly(phenylene ether) can serve as a charring agent, the amount of metal hydroxide required to achieve a UL-94 V-0 rating can be less than the amount needed to achieve a UL-94 V0 rating when the poly(phenylene ether) is not present. In some embodiments, the composition comprises 5 to 50 weight percent, based on the total weight of the composition, of magnesium hydroxide, aluminum hydroxide, or a combination thereof.

The composition can optionally comprise additives selected from the group consisting of fillers, stabilizers, antioxidants, mold release agents, processing aids, drip retardants, nucleating agents, UV blockers, dyes, pigments, fragrances, anti-static agents, mineral oil, metal deactivators, antiblocking agents, and combinations thereof. In some embodiments, the additives are selected from the group consisting of antioxidants, drip retardants, pigments, and a mixture thereof. When present in the composition, the additives can be present in a combined amount of 0.1 to 10 weight percent, specifically 0.2 to 5 weight percent, and more specifically 0.5 to 2 weight percent, based on the total weight of the composition.

In more specific embodiments, the composition comprises: 65 to 97.5 weight percent of a polyolefin selected from low density polyethylene, medium density polyethylene, and a combination thereof; 2.5 to 25 weight percent of an oligomeric poly(phenylene ether) having an intrinsic viscosity of 0.01 to 0.12 deciliters per gram, as measured in chloroform at 25° C., selected from a monofunctional poly(2,6-dimethyl-4-phenylene ether), a bifunctional poly(2,6-dimethyl-4-phenylene ether), and a combination thereof; and 0 to 10 weight percent of a polystyrene-poly(ethylene-butylene)-polystyrene triblock copolymer comprising 20 to 60 weight percent polystyrene content, based on the weight of the triblock copolymer, and having a weight average molecular weight of 50,000 to 100,000 atomic mass units, as measured by gel permeation chromatography; wherein all weight percents are based on the combined weight of the polyolefin, the poly(phenylene ether), and the polystyrene-poly(ethylene-butylene)-polystyrene triblock copolymer. In some embodiments, this composition further comprises 0.5 to 10 weight percent of the polystyrene-poly(ethylene-butylene)-polystyrene triblock copolymer.

A method of forming the composition comprises melt blending 65 to 97.5 weight percent of a polyolefin; 2.5 to 25 weight percent of an oligomeric poly(phenylene ether) having an intrinsic viscosity of 0.01 to 0.12 deciliters per gram, as measured in chloroform at 25° C.; and 0 to 10 weight percent of a compatibilizer; wherein all weight percents are based on the combined weight of the polyolefin, the poly(phenylene ether), and the compatibilizer.

The melt blending can be performed using known equipment such as Banbury mixers, single-screw extruders, twin-screw extruders, multi-screw extruders, co-kneaders, and the like. For example, the present composition can be prepared by melt-blending the components in a twin-screw extruder at a temperature of 180 to 230° C., specifically 190 to 220° C. All of the above-described variations in the composition apply as well to the method of preparing the composition.

The composition can be formed into articles by shaping, extruding, or molding. Articles can be molded from the composition by known methods, such as injection molding, injection compression molding, gas assist injection molding, rotary molding, blow molding, compression molding, and related molding processes. In some embodiments, the article is formed by injection molding. The injection molding conditions can include a barrel temperature of 180 to 230° C., specifically 190 to 220° C., and a mold temperature of 20 to 60° C., specifically 30 to 50° C. Specific injection molding procedures applicable to the composition are described in the working examples below. All of the above-described variations in the composition apply as well to the injection molded article comprising the composition. In some embodiments, an article comprises a composition comprising 65 to 97.5 weight percent of a polyolefin; 2.5 to 25 weight percent of an oligomeric poly(phenylene ether) having an intrinsic viscosity of 0.01 to 0.12 deciliters per gram, as measured in chloroform at 25° C.; and 0 to 10 weight percent of a compatibilizer; wherein all weight percents are based on the combined weight of the polyolefin, the poly(phenylene ether), and the compatibilizer.

The invention includes at least the following embodiments.

Embodiment 1

A composition comprising: 65 to 97.5 weight percent of a polyolefin; 2.5 to 25 weight percent of an oligomeric poly(phenylene ether) having an intrinsic viscosity of 0.01 to 0.15 deciliters per gram, as measured in chloroform at 25° C.; and 0 to 10 weight percent of a compatibilizer; wherein all weight percents are based on the combined weight of the polyolefin, the poly(phenylene ether), and the compatibilizer.

Embodiment 2

The composition of embodiment 1, wherein the oligomeric poly(phenylene ether) has a weight average molecular weight of 1,000 to 10,000 atomic mass units, as measured by gel permeation chromatography.

Embodiment 3

The composition of embodiment 1 or 2, wherein the oligomeric poly(phenylene ether) comprises poly(2,6-dimethyl-4-phenylene ether).

Embodiment 4

The composition of embodiment 1 or 2, wherein the oligomeric poly(phenylene ether) comprises a bifunctional poly(phenylene ether) having the structure wherein each occurrence of $Q^1$ and $Q^2$ is independently selected from the group consisting of halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to 30, provided that the sum of x and y is at least 2; and L has the structure wherein each occurrence of $R^1$, $R^2$, $R^3$, and $R^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group.

Embodiment 5

The composition of embodiment 1 or 2, wherein the poly(phenylene ether) comprises a bifunctional poly(phenylene ether) having the structure wherein each occurrence of $Q^5$ and $Q^6$ is independently methyl, di-n-butylaminomethyl, or morpholinomethyl; and each occurrence of a and b is independently 0 to 20, with the proviso that the sum of a and b is at least 2.

Embodiment 6

The composition of any of embodiments 1-5, wherein the polyolefin comprises a polyethylene homopolymer, an ethylene-containing copolymer, a polypropylene homopolymer, a polypropylene-containing copolymer, or a combination thereof.

Embodiment 7

The composition of any of embodiments 1-5, wherein the polyolefin comprises a polyethylene homopolymer, an ethylene-containing copolymer, or a combination thereof.

Embodiment 8

The composition of any of embodiments 1-5, wherein the polyolefin comprises low density polyethylene, very low density polyethylene, linear low density polyethylene, medium density polyethylene, high density polyethylene, ethylene-propylene copolymer, ethylene-vinyl acetate copolymer, or a combination thereof.

Embodiment 9

The composition of any of embodiments 1-5, wherein the polyolefin comprises a polyethylene homopolymer.

Embodiment 10

The composition of any of embodiments 1-5, wherein the polyolefin comprises low density polyethylene, medium density polyethylene, high density polyethylene, or a combination thereof.

Embodiment 11

The composition of embodiment 1 or 2, wherein the oligomeric poly(phenylene ether) comprises a bifunctional poly(phenylene ether) having the structure wherein each occurrence of $Q^5$ and $Q^6$ is independently methyl, di-n-butylaminomethyl, or morpholinomethyl; and each occurrence of a and b is independently 0 to 20, with the proviso that the sum of a and b is at least 2; and the polyolefin comprises polyethylene homopolymer.

Embodiment 12

The composition of any of claims 1-11, comprising a continuous phase comprising the polyolefin, and a disperse phase comprising the oligomeric poly(phenylene ether).

Embodiment 13

The composition of any of embodiments 1-12, comprising 0 to less than 0.5 weight percent of the compatibilizer, wherein the compatibilizer comprises a hydrogenated block copolymer of an alkenyl aromatic compound and a conjugated diene, a non-hydrogenated block copolymer of an alkenyl aromatic compound and a conjugated diene, or a combination thereof.

Embodiment 14

The composition of any of embodiments 1-12, comprising 0.5 to 10 weight percent of the compatibilizer, wherein the compatibilizer comprises a hydrogenated, partially hydrogenated, or non-hydrogenated block copolymer of an alkenyl aromatic compound and a conjugated diene, or a combination thereof.

Embodiment 15

The composition of any of embodiments 1-12, comprising 0.5 to 10 weight percent of the compatibilizer, wherein the compatibilizer comprises a polystyrene-poly(ethylene-butylene)-polystyrene triblock copolymer (SEBS), a polystyrene-poly(ethylene-propylene)-polystyrene triblock copolymer (SEPS), a polystyrene-poly(ethylene-ethylene/propylene)-polystyrene triblock copolymer, a polystyrene-poly(butadiene-styrene)-polystyrene triblock copolymer, a polystyrene-polyisoprene-polystyrene triblock copolymer, a polystyrene-polybutadiene-polystyrene triblock copolymer (SBS), a polystyrene-polyisoprene-polystyrene triblock copolymer (SIS), a polystyrene-polybutadiene diblock copolymer (SB), a polystyrene-polyisoprene diblock copolymer (SI), or a combination thereof.

Embodiment 16

The composition of any of embodiments 1-12, comprising 0.5 to 10 weight percent of the compatibilizer, based on the total weight of the composition, wherein the compatibilizer comprises a polystyrene-poly(ethylene-butylene)-polystyrene triblock copolymer comprising 20 to 60 weight percent polystyrene, based on the weight of the triblock copolymer, and having a weight average molecular weight of 50,000 to 100,000 atomic mass units, as measured by gel permeation chromatography.

Embodiment 17

The composition of any of embodiments 1-16, further comprising 0.02 to 1 weight percent, based on the total weight of the composition, of a polytetrafluoroethylene.

Embodiment 18

The composition of any of embodiments 1-17, further comprising 1 to 60 weight percent, based on the total weight of the composition, of a flame retardant.

Embodiment 19

The composition of embodiment 18, wherein the flame retardant comprises a metal hydroxide, a phosphoric acid salt, an organophosphate ester, a brominated organic compound, antimony trioxide, or a combination thereof.

Embodiment 20

The composition of any of claims 1-17, further comprising 5 to 50 weight percent, based on the total weight of the composition, of magnesium hydroxide, aluminum hydroxide, or a combination thereof.

Embodiment 21

The composition of embodiment 1, wherein the polyolefin is selected from low density polyethylene, medium density polyethylene, and a combination thereof; the oligomeric poly(phenylene ether) has an intrinsic viscosity of 0.01 to 0.12 deciliters per gram, as measured in chloroform at 25° C., and is selected from a monofunctional poly(2,6-dimethyl-4-phenylene ether), a bifunctional poly(2,6-dimethyl-4-phenylene ether), and a combination thereof, and the compatibilizer comprises polystyrene-poly(ethylene-butylene)-polystyrene triblock copolymer comprising 20 to 60 weight percent polystyrene content, based on the weight of the triblock copolymer, and having a weight average molecular weight of 50,000 to 100,000 atomic mass units, as measured by gel permeation chromatography.

Embodiment 21a

A composition comprising: 65 to 97.5 weight percent of a polyolefin selected from low density polyethylene, medium density polyethylene, and a combination thereof 2.5 to 25 weight percent of an oligomeric poly(phenylene ether) having an intrinsic viscosity of 0.01 to 0.12 deciliters per gram, as measured in chloroform at 25° C., selected from monofunctional poly(2,6-dimethyl-4-phenylene ether), bifunctional poly(2,6-dimethyl-4-phenylene ether), and a combination thereof and 0 to 10 weight percent of a polystyrene-poly(ethylene-butylene)-polystyrene triblock copolymer comprising 20 to 60 weight percent polystyrene content, based on the weight of the triblock copolymer, and having a weight average molecular weight of 50,000 to 100,000 atomic mass units, based on gel permeation chromatography; wherein all weight percents are based on the combined weight of the polyolefin, the poly(phenylene ether), and the polystyrene-poly(ethylene-butylene)-polystyrene triblock copolymer.

Embodiment 22

The composition of embodiment 21 or 21a, comprising 0.5 to 10 weight percent of the polystyrene-poly(ethylene-butylene)-polystyrene triblock copolymer.

Embodiment 23

An article comprising the composition of any of embodiments 1-22.

The invention is further illustrated by the following non-limiting examples.

EXAMPLES

These examples illustrate the unexpected benefits of the use of oligomeric poly(phenylene ether) as an organic filler in polyolefins.

Components used to prepare the compositions are described in Table 1.

TABLE 1

| Component | Description |
|---|---|
| PPE 0.33 | Poly(2,6-dimethyl-1,4-phenylene ether), CAS Reg. No. 25134-01-4, having an intrinsic viscosity of 0.33 deciliter per gram, measured in chloroform at 25° C., an $M_w$ of 32,400 amu and $M_n$ of 15,900 amu, as measured by GPC, and a $T_g$ at half-width of 210° C. measured by DSC; obtained as PPO ™ 630 from SABIC Innovative Plastics. |
| SA120 | Poly(2,6-dimethyl-1,4-phenylene ether), CAS Reg. No. 25134-01-4, having an intrinsic viscosity of 0.12 deciliter per gram, measured in chloroform at 25° C., an $M_w$ of 6,300 g/mol and an $M_n$ of 2,350 amu, as measured by GPC, and a $T_g$ at half-width of 165° C. measured by DSC; obtained as NORYL ™ SA120 from SABIC Innovative Plastics. |
| SA90 | Bifunctional poly(2,6-dimethyl-1,4-phenylene ether), CAS Reg. No. 927818-87-9, having an intrinsic viscosity of 0.09 deciliter per gram, measured in chloroform at 25° C., an absolute $M_n$ of 1,800 g/mol as measured by NMR, and an $M_w$ of 2,600 amu and an $M_n$ of 1,250 amu, as measured by GPC, and a $T_g$ at half-width of 135° C. measured by DSC; obtained as NORYL ™ SA90 from SABIC Innovative Plastics. |
| LDPE | Low density polyethylene, CAS Reg. No. 9002-88-4, having a density of 0.918 g/cm³, measured in accordance with ASTM D1505, and a MFR of 0.75 g/10 min., measured at 190° C. and 2.16 kg weight in accordance with ASTM D1238; obtained as PETROTHENE ™ 940000 from LyondellBasell Industries. |
| MDPE | Medium density polyethylene, CAS Reg. No. 25213-02-9, having a density of 0.935 g/cm³, measured in accordance with ASTM D1505, and a MFR of 0.25 g/10 min., measured at 190° C. and 2.16 kg weight in accordance with ASTM D1238; obtained as PETROTHENE ™ 940000 from LyondellBasell Industries. |
| h-PP | Isotactic polypropylene homopolymer, CAS Reg. No. 9003-07-0, having a density of 0.935 g/cm³, measured in accordance with ASTM D1505, and a MFR of 1.3 g/10 min., measured at 230° C. with a 2.16 kg weight in accordance with ASTM D1238; obtained as F0130 from Braskem. |
| SEBS | Polystyrene-poly(ethylene-butylene)-polystyrene triblock copolymer, CAS Reg. No. 66070-58-4, having a polystyrene content of 42%, a MFR of 0.80 g/10 min., measured at 230° C. and 2.16 kg in accordance with ISO 1133, and a $M_w$ of 77,500 amu, an $M_n$ of 26,600 amu, and a PDI of 2.9, as measured by GPC; obtained as TUFTEC ™ H1051 from AKelastomers, Inc. |
| MDH | Magnesium dihydroxide, CAS Reg. No. 1309-42-8, having a median particle size of 1.0 micrometers, obtained as MAGSHIELD ™ from Martin Marietta Magnesia Specialties. |
| TSAN | Poly(styrene-acrylonitrile)-encapsulated polytetrafluoroethylene; comprising poly(styrene-acrylonitrile) CAS Reg. No. 9003-54-7; polytetrafluoroethylene CAS Reg. No. 9002-84-0; obtained from SABIC Innovative Plastics. |

The compositions were prepared from the individual components as follows. All compositions were compounded on a 30-mm extruder operating at 400 rpm and production rate of 9.07-11.3 kg/hr. (20-25 lbs./hr.) using a temperature profile of 190-210-220-220° C. The PPE was fed directly through a feeder. With all blends, the raw materials were fed through two feeders into the feed throat. Injection molding was conducted at 204/37.8° C. (400/100° F., melt/tool) to form test parts.

Heat deflection temperature (HDT), expressed in units of degrees centigrade, was measured at 1.82 megapascals (264 pounds per square inch) on 3.2 millimeter (0.125 inch) thick bars according to ASTM D648-07.

Tensile strength at yield and tensile stress at 3.5% strain, both expressed in megapascals (MPa), and tensile elongation at break, expressed in percent (%), were measured at 23° C. according to ASTM D638-10.

Flexural modulus and flexural strength, both expressed in megapascals (MPa), were measured at 23° C. according to ASTM D790-10.

Flammability properties were measured at sample thickness of 3 millimeters (mm), according to Underwriter's Laboratory Bulletin 94 "Tests for Flammability of Plastic Materials, UL 94", 20 mm Vertical Burning Flame Test. Burning and dripping characteristics of the test parts were reported after first, second, third, and fourth flame applications. The results are reported as "NF" (no flame), "D" (drip), or time to dripping in seconds, in Table 5 and as "NF" (no flame), time to "DLW" (dripping like water), and time to "DC" (dripping chunks) in Table 8.

Examples 1-18 and Comparative Examples 1-3

Blends of oligomeric PPE with LDPE, MDPE and h-PP were prepared. The compositions and properties are summarized in Tables 2-4, respectively. At load loadings, for example 2.5 to 5 wt %, the oligomeric PPE can serve as a nucleating agent. As an organic filler, the PPE affects the density, flexural modulus, and heat deformation resistance of the polyolefin.

TABLE 2

| Example | CE 1 | 1 | 2 | 3 | 4 | 5 | 6 |
|---|---|---|---|---|---|---|---|
| Compositions (Weight Percent) | | | | | | | |
| LDPE | 100 | 95 | 90 | 80 | 95 | 90 | 80 |
| SA120 | — | 5 | 10 | 20 | — | — | — |
| SA90 | — | — | — | — | 5 | 10 | 20 |
| Properties | | | | | | | |
| Flexural Modulus (MPa) | 150 | 210 | 290 | 460 | 210 | 280 | 450 |
| Stress, 3.5% Strain (MPa) | 4.5 | 6.4 | 8.9 | 14.4 | 6.6 | 8.6 | 13.8 |
| HDT, 0.45 MPa (° C.) | — | 41.1 | 45.2 | 53.0 | 40.8 | 43.4 | 49.9 |
| Notched Izod, 23° C. (kJ/m²) | 40.7 | 44.3 | 36.5 | 13.9 | 41.0 | 30.9 | 14.9 |
| Elongation at Break (%) | 57 | 63 | 47 | 21 | 54 | 49 | 8 |
| Stress at Yield (MPa) | 14.2 | 13.0 | 12.5 | 13.7 | 12.6 | 12.3 | 12.3 |

TABLE 3

| Example | CE 2 | 7 | 8 | 9 | 10 | 11 | 12 |
|---|---|---|---|---|---|---|---|
| Compositions (Weight Percent) | | | | | | | |
| MDPE | 100 | 95 | 90 | 80 | 95 | 90 | 80 |
| SA120 | — | 5 | 10 | 20 | — | — | — |
| SA90 | — | — | — | — | 5 | 10 | 20 |
| Properties | | | | | | | |
| Flexural Modulus (MPa) | 510 | 550 | 650 | 830 | 580 | 650 | 820 |
| Stress, 3.5% Strain (MPa) | 10.9 | 12.6 | 15.6 | 21.9 | 13.5 | 15.5 | 21.3 |
| HDT, 0.45 MPa (° C.) | 41.8 | 45.3 | 50.1 | 61.7 | 44.7 | 47.9 | 57.8 |
| Notched Izod, 23° C. (kJ/m²) | 41.5 | 23.0 | 9.7 | 5.4 | 21.8 | 10.0 | 5.1 |
| Elongation at Break (%) | 161 | 120 | 110 | 6 | 180 | 28 | 4 |
| Stress at Yield (MPa) | 16.2 | 17.1 | 19.0 | 22.1 | 17.5 | 18.5 | 20.2 |

TABLE 4

| Example | CE 3 | 13 | 14 | 15 | 16 | 17 | 18 |
|---|---|---|---|---|---|---|---|
| Compositions (Weight Percent) | | | | | | | |
| h-PP | 100 | 95 | 90 | 80 | 95 | 90 | 80 |
| SA120 | — | 5 | 10 | 20 | — | — | — |
| SA90 | — | — | — | — | 5 | 10 | 20 |
| Properties | | | | | | | |
| Flexural Modulus (MPa) | 1860 | 1770 | 1680 | 1780 | 1730 | 1710 | 1730 |
| Stress, 3.5% Strain (MPa) | 42.2 | 41.6 | 41.4 | 45.7 | 40.8 | 41.5 | 46.6 |
| HDT, 0.45 MPa (° C.) | 60.0 | 60.1 | 64.7 | 74.4 | 59.1 | 64.5 | 73.7 |
| Notched Izod, 23° C. (kJ/m²) | 4.2 | 2.7 | 2.7 | 1.8 | 2.8 | 2.7 | 1.9 |
| Elongation at Break (%) | 22 | 14 | 8 | 4 | 10 | 7 | 3 |
| Stress at Yield (MPa) | 36.7 | 35.5 | 35.6 | 34.4 | 33.4 | 34.1 | 32.4 |

As seen in Tables 2-4, for blends of SA90 and SA120 with the polyolefins, heat deformation resistance is increased as a function of oligomeric PPE content. Without being bound by theory, this could be due to oligomeric PPE domains in the polyolefin serving as hard, heat resistant, reinforcing filler particles, or as nucleation sites. In polyethylene, SA120 is more effective than SA90 in improving heat deformation resistance. In polypropylene however, SA90 and SA120 provide very similar results. Other blends of SA90 and SA120 were evaluated as described below.

Based on the observed reduction in impact and elongational properties with increasing oligomeric PPE content, the polyolefin-oligomeric PPE interface is likely to be relatively weak compared to the continuous polyolefin phase. Interestingly, flexural modulus is unaffected by addition of oligomeric PPE to h-PP. Isotactic homopolypropylene has an inherently high modulus, and adding an organic filler does not have the same effect of increasing flexural modulus that is seen in the lower modulus polyethylenes.

When abusively handling the extruded strands and molded test parts formed from the compositions, at 20 wt % oligomeric PPE content, the test parts tended to delaminate. In order to avoid delamination, the oligomeric PPE and polyolefin can be compatibilized with compatibilizing agents. However at the lower oligomeric PPE contents, such as 5 and 10 wt %, without compatibilizer, the polyolefin maintains more of its inherent physical properties.

Examples 19-39 and Comparative Examples 4-6

Flame Retardance, Compatibilization, and Drip Reduction

MDPE was chosen as the polyolefin for further study because it exhibited acceptable elongational properties in blends with 5 and 10 wt % oligomeric PPE. Low-flow h-PP was chosen for comparison. The effect of hydrogenated styrene-butadiene-styrene block copolymer rubbers (SEBS), on mechanical properties, the effect of oligomeric PPE on flame retardance; and the effect of TSAN on flame properties of the polyolefin/oligomeric PPE blends were evaluated. The compositions and physical properties of blends of MDPE, SA120, and SEBS or TSAN, are summarized in Table 5; the compositions and physical properties of blends of MDPE, SA120, and SEBS, are summarized in Table 6; and the compositions and physical properties of blends of h-PP with SA120 and SEBS are summarized in Table 7.

was increased incrementally to compensate for the high SA120 amount. Surprisingly, even a very low loading of 1 wt % TUFTEC™ H1051 (Ex. 29) restores the elongation to above the level of virgin MDPE (Comparative Ex. 5) while maintaining most of the gain in heat deformation resistance. These results show that the SEBS compatibilizer can help retain or increase elongation obtained with SA120, while not adversely affecting the increased heat deformation resistance obtained with SA120.

Comparative Example 4, in which oligomeric PPE was absent, failed the UL-94 flammability test (conducted on 3-mm thick ASTM tensile bars for screening purposes).

TABLE 5

| Example | CE 4 | 19 | 20 | 21 | 22 | 23 | 24 | 25 | 26 | 27 |
|---|---|---|---|---|---|---|---|---|---|---|
| Compositions (Weight Percent) | | | | | | | | | | |
| MDPE | 100 | 95 | 90 | 80 | 94.5 | 89.5 | 79.5 | 93.75 | 87.5 | 75 |
| SA120 | — | 5 | 10 | 20 | 5 | 10 | 20 | 5 | 10 | 20 |
| TSAN | — | — | — | — | 0.5 | 0.5 | 0.5 | — | — | — |
| SEBS | — | — | — | — | — | — | — | 1.25 | 2.5 | 5 |
| Properties | | | | | | | | | | |
| Flex. Modulus (MPa) | 510 | 550 | 650 | 830 | — | — | — | — | — | — |
| HDT, 0.45 MPa (° C.) | 42 | 46.7 | 50.7 | 60.8 | 51.6 | 48.9 | 59.5 | 42.6 | 49.75 | 53.2 |
| N-Izod, 23° C. (kJ/m²) | 42 | 17.9 | 9.6 | 5.1 | 19.5 | 9.4 | 5 | 46.5 | 48.1 | 44.5 |
| Elongation at Break (%) | 330 | 178 | 182 | 8.6 | 238 | 174 | 14 | 252 | 250 | 226 |
| TS at 3.5% Strain (MPa) | 14.4 | 13.7 | 14.7 | 20.6 | 14 | 18.5 | 19.6 | 15.3 | 16.9 | 16.7 |
| UL94, 3 mm Thickness | | | | | | | | | | |
| 1st Flame | NF | NF | NF | NF | NF | NF | NF | NF | NF | NF |
| 2nd Flame | D | NF | NF | NF | NF | NF | 13 s to D | NF | NF | NF |
| 3rd Flame | — | D | D | D | 10 s to D | 7 s to D | — | NF/D | D | D |
| 4th Flame | — | — | — | — | — | — | — | D | — | — |
| UL 94 Rating | fail | V-0 | V-0 | V-0 | V-0 | V-0 | fail | V-0 | V-0 | V-0 |

In Table 5, "TS" denotes "tensile strength", "s" denotes "seconds", "NF" denotes "no flame", and "D" denotes "drip".

Hydrogenated styrene-butadiene-styrene block copolymer rubbers (SEBS) can serve as compatibilizers in polyolefin/oligomeric PPE blends. TUFTEC™ H1051 was found to be particularly effective in maintaining elongational properties in polyolefin/oligomeric PPE blends. Without wishing to be bound to theory, it is believed to be effective as a compatibilizer because of its high olefinic content and rubbery nature, which is compatible with polyolefins, and its styrene content, which is compatible with PPE.

Polytetrafluoroethylene (PTFE) and its derivatives can be used as anti-drip additives in many polymers including polyolefins and NORYL™ blends. In these examples, 0.5 wt % of TSAN (poly(styrene-acrylonitrile)-encapsulated polytetrafluoroethylene), which is a moderately high amount, was used.

Examples 25-27 have TUFTEC™ H1051 as a compatibilizer and Examples 22-24 have 0.5 wt % TSAN as an anti-drip additive. Comparative Ex. 4 and Examples 19-21 do not have TSAN or TUFTEC™ H1051. It is evident from Comparative Ex. 4 and Examples 19-21 that while SA120 increases flexural modulus and heat deformation resistance, it is detrimental to elongation and impact strength. In Examples 25-27 of Table 5, the SEBS amounts were increased proportionally to the SA120 amount. In Examples 28-33 of Table 6, the SA120 amount was held constant at 20 wt %, and the SEBS amount Although the test bars did not catch fire on the first application of flame (no flame, "NF"), they ignited, dripped, and burned to the clamp with a clean blue flame on the second exposure.

At a 5% or higher loading of SA120 (Examples 19-21) or SA90, test bars did not ignite on the first two flame exposures, achieving a UL-94 rating of V-0. However, the test bars ignited, dripped, and burned with a yellowish flame to the clamp on the third exposure. With 20 wt % oligomeric PPE (Table 7), there are clear signs of charring and a struggling flame. Thus in end use applications, the addition of oligomeric PPE at these levels is expected to delay ignition, but not significant alter ultimate burning behavior.

Examples 22-24 show that TSAN delays dripping. However it does not change the overall outcome of UL-94 flame resistance testing. Even when the samples exhibit V-0 performance based on the first two applications of flame, dripping is observed on the third application of flame.

TABLE 6

| Example | CE 5 | 28 | 29 | 30 | 31 | 32 | 33 |
|---|---|---|---|---|---|---|---|
| Compositions (Weight Percent) | | | | | | | |
| MDPE | 100 | 80 | 79 | 78 | 77 | 76 | 75 |
| SA120 | — | 20 | 20 | 20 | 20 | 20 | 20 |
| SEBS | — | — | 1 | 2 | 3 | 4 | 5 |

TABLE 6-continued

| Example | CE 5 | 28 | 29 | 30 | 31 | 32 | 33 |
|---|---|---|---|---|---|---|---|
| Properties | | | | | | | |
| Flexural Modulus (MPa) | 510 | 790 | 780 | 770 | 760 | 730 | 730 |
| Flexural Strength (MPa) | 15.5 | 27.6 | 25.7 | 24.7 | 24.0 | 22.5 | 22.3 |
| Stress, 3.5% Strain (MPa) | 10.9 | 20.4 | 19.3 | 18.6 | 18.0 | 16.8 | 16.7 |
| HDT, 1.82 MPa (° C.) | 39.2 | 61.2 | 55.1 | 55.5 | 53.3 | 52.2 | 50.5 |
| N-Izod, 23° C. (kJ/m$^2$) | 49.9 | 5.9 | 5.0 | 13.3 | 22.1 | 24.9 | 30.2 |
| Elongation at Break (%) | 80 | 15 | 91 | 190 | 200 | 260 | 160 |
| Stress at Break (MPa) | 13.0 | 19.8 | 16.2 | 15.6 | 15.0 | 14.4 | 17.1 |
| Stress at Yield (MPa) | 16.2 | 21.3 | 20.2 | 19.5 | 18.7 | 17.9 | 19.2 |

An study similar to the one summarized in Table 6 was conducted with h-PP used in place of MDPE. The results are summarized in Table 7.

TABLE 7

| Example | CE 6 | 34 | 35 | 36 | 37 | 38 | 39 |
|---|---|---|---|---|---|---|---|
| Compositions (Weight Percent) | | | | | | | |
| h-PP | 100 | 80 | 79 | 78 | 77 | 76 | 75 |
| SA120 | — | 20 | 20 | 20 | 20 | 20 | 20 |
| SEBS | — | — | 1 | 2 | 3 | 4 | 5 |
| Properties | | | | | | | |
| Flexural Modulus (MPa) | 1750 | 1910 | 1810 | 1800 | 1810 | 1750 | 1720 |
| Flexural Strength (MPa) | 49.6 | 57.9 | 56.8 | 55.2 | 53.5 | 52.0 | 50.5 |
| Stress, 3.5% Strain (MPa) | 41.0 | 48.9 | 46.9 | 45.8 | 44.3 | 43.2 | 41.9 |
| HDT, 1.8 MPa (° C.) | 56.2 | 74.7 | 71.3 | 68.6 | 65.4 | 64.9 | 65.4 |
| N-Izod, 23° C. (kJ/m$^2$) | 4.0 | 3.1 | 2.7 | 3.2 | 3.5 | 3.8 | 4.9 |
| Elongation at Break (%) | 40 | 15 | 35 | 53 | 94 | 130 | 170 |
| Stress at Break (MPa) | 27.7 | 33.6 | 31.9 | 27.4 | 18.9 | 16.7 | 18.2 |
| Stress at Yield (MPa) | 34.5 | 29.8 | 38.4 | 37.4 | 36.9 | 36.1 | 35.7 |

Surprisingly, in the SEBS-compatibilized polypropylene blends of Examples 35-39, both elongation and heat deformation resistance are increased at a given flexural modulus, in particular as seen in a comparison of Comparative Ex. 6 to Ex. 39. Thus the balance of the opposing properties of flexural modulus and heat deformation resistance versus elongation can be improved by the use of SEBS compatibilizer in combination with oligomeric PPE.

Examples 40-44 and Comparative Examples 7-8

Effect of Magnesium Dihydroxide

Metal hydroxides, such as magnesium dihydroxide and aluminum hydroxide, need to be used at very high loadings of 50 wt % and higher, to be effective in flame-retarding polyolefins. At such high loading levels, the mechanical properties of the resin are sacrificed. However the inventors have determined that addition of oligomeric PPE, which produces char, reduces the amount of metal hydroxide flame retardant needed to achieve the same flame retardance. The effect of magnesium hydroxide on the flammability of MDPE was evaluated in the presence and absence of oligomeric PPE. The compositions and physical properties of the blends are summarized in Table 8.

TABLE 8

| Example | CE 7 | CE 8 | 40 | 41 | 42 |
|---|---|---|---|---|---|
| Compositions (Weight Percent) | | | | | |
| MDPE | 100 | 90 | 87.5 | 85 | 80 |
| SA120 | — | — | 2.5 | 5 | 10 |
| MDH | — | 10 | 10 | 10 | 10 |
| Properties | | | | | |
| Flexural Modulus (MPa) | 510 | 600 | 640 | 690 | 820 |
| HDT, 1.82 MPa (° C.) | 42 | 42 | 43 | 45 | 49 |
| Notched Izod, 23° C. (kJ/m$^2$) | 42 | 25 | 26 | 19 | 10 |
| Elongation at Break (%) | 160 | 110 | 130 | 150 | 150 |
| UL94, 3 mm Thick | | | | | |
| 1st Flame | 15 s to DLW | NF | NF | NF | NF |
| 2nd Flame | — | 12 s to DC | 2 s to DLW | 2 s to DLW | 8 s to DC |

In Table 8, "NF" denotes "no flame", "DLW" denotes "dripping like water", and "DC" denotes "dripping chunks". As can be seen from Table 8, MDH delays both ignition and dripping in UL-94 testing. MDH also increases flexural modulus, but reduces elongation. SA120 partially restores the elongation of Comparative Ex. 8, and increases flexural modulus and heat deformation resistance. Without being bound by theory, the positive effect of SA120 on elongation suggests a slight compatibilizing effect at the MDPE/MDH interface. The affinity of MDH for oligomeric PPE can be seen in FIG. 2, wherein MDH particles can be seen within the cavities formed by toluene extraction of the oligomeric PPE domains during sample preparation. Without any other type of compatibilization, however, both SA120 and MDH have a detrimental effect on impact strength.

Examples 43-48

Effect of PPE Molecular Weight on Properties and Morphology

SA120 and SA90 have similar effects on polyolefin properties. The effect of PPE molecular weight on polyolefin properties was evaluated in the blends of Table 9, in which the effect of PPE 0.33, having a $M_w$ of 32,400 amu, was compared to the effect of SA120, having a $M_w$ of 6,300 amu, and SA90, having a $M_w$ of 2,600 amu, as measured by gel permeation chromatography.

TABLE 9

| Example | 43 | 44 | 45 | 46 | 47 | 48 |
|---|---|---|---|---|---|---|
| Compositions (Weight Percent) | | | | | | |
| MDPE | 95 | 90 | 85 | 95 | 90 | 85 |
| PPE 0.33 | 5 | 10 | 15 | — | — | — |
| SA120 | — | — | — | 5 | 10 | 15 |
| Properties | | | | | | |
| Flexural Modulus (MPa) | 580 | 580 | 660 | 590 | 630 | 730 |
| Flexural Strength (MPa) | 16.9 | 17.1 | 18.8 | 18.1 | 18.9 | 24.6 |
| Stress, 3.5% Strain (MPa) | 12.3 | 12.3 | 13.8 | 13.1 | 14.8 | 18.3 |
| HDT, 1.82 MPa (° C.) | 43.1 | 43.5 | 45.1 | 45.9 | 49.3 | 55.0 |
| Notched Izod, 23° C. (kJ/m$^2$) | 19.8 | 14.7 | 8.1 | 17 | 10.7 | 7.6 |
| Elongation at Break (%) | 130 | 63 | 28 | 153 | 74 | 57 |

While the physical property trends of MDPE blends with SA90 and SA120 (oligomeric PPE) and high molecular weight PPE (PPE 0.33) are similar, the magnitude of the increases in flexural modulus and heat deformation resistance is more pronounced for SA120. Without being bound by theory, the differences in the magnitude of increases could be due to morphological differences. The interaction between the polyethylene continuous phase and PPE can differ based on the melt viscosity of the PPE phase, which in turns is a function of molecular weight. The SEM micrographs in FIG. 1 address this possibility. Microtoming, toluene extraction, and scanning electron microscopy (SEM) was conducted on MDPE/PPE blends in which the PPE molecular weight ranged over an order of magnitude. FIG. 1 depicts scanning electron microscopy (SEM) images for 90/10 MDPE/PPE blends after microtoming and toluene extraction: 10 weight percent PPE 0.33 (top, Example 44); 10 weight percent SA120 (center, Example 47); and 10 weight percent SA90 (right, Example 11). The average PPE domain size and size distributions of the PPE 0.33 and SA120 blends appear qualitatively similar, while the SA90 blend has smaller PPE domain sizes. Since differences in physical properties have been shown for both SA120 and SA90 blends versus PPE 0.33 blends, morphology is probably not the root cause for such differences. Without being bound by theory, another explanation could be that the very low molecular weight species within the molecular weight distribution of SA120 and SA90 are somewhat soluble in the polyolefin continuous phase. Migration of the low molecular weight PPE species into the polyolefin outside of the main PPE domains could induce nucleation of the polyolefin, which would result in improved physical properties. The relative concentration of these low molecular weight species may be so low that an overall loading level of at least 10 weight percent is required for the effect to be significant enough to affect physical properties.

Microtoming, toluene extraction, and scanning electron microscopy (SEM) was also conducted on MDPE/PPE/MDH blends in which the PPE molecular weight ranged over an order of magnitude. FIG. 2 depicts SEM images for 80/10/10 MDPE/PPE/MDH blends comprising 10 weight percent PPE 0.33 (top); 10 weight percent SA120 (center, Example 42); and 10 weight percent SA90 (bottom). FIG. 2 shows that MDH particles reside within the PPE domains as opposed to the continuous MDPE phase. Without being bound by theory, the MDH particles appear to get encapsulated by some fraction of the PPE domains, while the balance of the PPE domains are free of MDH. This is consistent with PPE serving as a compatibilizer for MDH in the MDPE/PPE/MDH blends of Examples 40-42 above, resulting in partial retention of elongation.

Examples 49-61 and Comparative Example 8

Effect of Oligomeric PPE on Blend Rheology

Capillary shear viscosities of polypropylene blends with SA90 or SA120 with and without SEBS rubber are summarized in Table 10.

TABLE 10

| Example | CE 8 | 49 | 50 | 51 | 52 | 53 | 54 | 55 |
|---|---|---|---|---|---|---|---|---|
| Compositions (Weight Percent) | | | | | | | | |
| h-PP | 100.0 | 95.0 | 90.0 | 80.0 | 79.0 | 78.0 | 77.0 | 76.0 |
| SA120 | — | 5.0 | 10.0 | 20.0 | 20.0 | 20.0 | 20.0 | 20.0 |
| SA90 | — | — | — | — | — | — | — | — |
| SEBS | — | — | — | — | 1.0 | 2.0 | 3.0 | 4.0 |
| Shear Rate (1/sec) | Shear Viscosity at 210° C. (Pa·s) | | | | | | | |
| 100 | 927 | 903 | 884 | 843 | 865 | 890 | 929 | 938 |
| 500 | 306 | 310 | 310 | 312 | 329 | 335 | 334 | 333 |
| 1000 | 182 | 189 | 188 | 194 | 207 | 205 | 202 | 203 |
| 1500 | 134 | 140 | 139 | 144 | 153 | 150 | 148 | 149 |
| 2000 | 108 | 113 | 114 | 115 | 122 | 121 | 120 | 120 |
| 3000 | 81.1 | 82.3 | 84.9 | 84.4 | 89.3 | 89.0 | 88.4 | 89.0 |

| Example | CE 8 | 56 | 57 | 58 | 59 | 60 | 61 | 62 |
|---|---|---|---|---|---|---|---|---|
| Compositions (Weight Percent) | | | | | | | | |
| h-PP | 100.0 | 75.0 | 80.0 | 79.0 | 78.0 | 77.0 | 76.0 | 75.0 |
| SA120 | — | 20.0 | — | — | — | — | — | — |
| SA90 | — | — | 20.0 | 20.0 | 20.0 | 20.0 | 20.0 | 20.0 |
| SEBS | — | 5.0 | — | 1.0 | 2.0 | 3.0 | 4.0 | 5.0 |
| Shear Rate (1/sec) | Shear Viscosity at 210° C. (Pa·s) | | | | | | | |
| 100 | 927 | 982 | 538 | 619 | 691 | 734 | 771 | 805 |
| 500 | 306 | 330 | 232 | 255 | 268 | 274 | 280 | 288 |
| 1000 | 182 | 201 | 149 | 161 | 166 | 169 | 172 | 175 |
| 1500 | 134 | 149 | 113 | 120 | 125 | 127 | 128 | 131 |
| 2000 | 108 | 120 | 92 | 99 | 101 | 103 | 104 | 106 |
| 3000 | 81.1 | 88.5 | 69.0 | 72.9 | 75.4 | 76.2 | 77.0 | 79.5 |

As can be seen from Table 10, addition of oligomeric PPE into a polypropylene reduces both low shear viscosity and shear thinning. With h-PP/SA120 blends, the decrease in shear thinning is due to a combination of lower viscosity at low shear rates and slightly elevated viscosity at high shear rates compared to h-PP alone that has gone through the same heat history. In h-PP/SA90 blends, the reduction in viscosity occurs at all shear rates, with higher reductions at low shear rates, resulting in an even flatter viscosity versus shear rate curve. In both blend types, addition of SEBS increases viscosity at both low and high shear rates.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context.

As used herein, "minimized" means that the composition comprises 0 to 0.5 weight percent, specifically 0 to 0.1 weight percent, more specifically 0 to 0.01 weight percent, and still more specifically 0 to 0.001 percent, based on the total weight of the composition, of the minimized or excluded component.

As used herein, the term, "excluded" means that the excluded component is not added to, and is therefore absent from, the composition.

The invention claimed is:
1. A composition comprising:
 65 to 97.5 weight percent of a polyolefin;
 2.5 to 25 weight percent of an oligomeric poly(phenylene ether) having an intrinsic viscosity of 0.01 to 0.12 deciliters per gram, as measured in chloroform at 25° C., and a weight average molecular weight of 1,200 to 8,000 atomic mass units, as measured by gel permeation chromatography; and
 0 to 10 weight percent of a compatibilizer;
 wherein all weight percents are based on the combined weight of the polyolefin, the poly(phenylene ether), and the compatibilizer.

2. The composition of claim 1, wherein the oligomeric poly(phenylene ether) comprises poly(2,6-dimethyl-4-phenylene ether).

3. The composition of claim 1, wherein the oligomeric poly(phenylene ether) comprises a bifunctional poly(phenylene ether) having the structure wherein each occurrence of $Q^1$ and $Q^2$ is independently selected from the group consisting of halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to 30, provided that the sum of x and y is at least 2; and L has the structure wherein each occurrence of $R^1$, $R^2$, $R^3$, and $R^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group.

4. The composition of claim 1, wherein the poly(phenylene ether) comprises a bifunctional poly(phenylene ether) having the structure wherein each occurrence of $Q^5$ and $Q^6$ is independently methyl, di-n-butylaminomethyl, or morpholinomethyl; and each occurrence of a and b is independently 0 to 20, with the proviso that the sum of a and b is at least 2.

5. The composition of claim 1, wherein the polyolefin comprises a polyethylene homopolymer, an ethylene-containing copolymer, a polypropylene homopolymer, a polypropylene-containing copolymer, or a combination thereof.

6. The composition of claim 1, wherein the polyolefin comprises a polyethylene homopolymer, an ethylene-containing copolymer, or a combination thereof.

7. The composition of claim 1, wherein the polyolefin comprises low density polyethylene, very low density polyethylene, linear low density polyethylene, medium density polyethylene, high density polyethylene, ethylene-propylene copolymer, ethylene-vinyl acetate copolymer, or a combination thereof.

8. The composition of claim 1, wherein the polyolefin comprises a polyethylene homopolymer.

9. The composition of claim 1, wherein the polyolefin comprises low density polyethylene, medium density polyethylene, high density polyethylene, or a combination thereof.

10. The composition of claim 1, wherein the oligomeric poly(phenylene ether) comprises a bifunctional poly(phenylene ether) having the structure wherein each occurrence of $Q^5$ and $Q^6$ is independently methyl, di-n-butylaminomethyl, or morpholinomethyl; and each occurrence of a and b is independently 0 to 20, with the proviso that the sum of a and b is at least 2; and the polyolefin comprises polyethylene homopolymer.

11. The composition of claim 1, comprising a continuous phase comprising the polyolefin, and a disperse phase comprising the oligomeric poly(phenylene ether).

12. The composition of claim 1, comprising 0 to less than 0.5 weight percent of the compatibilizer, wherein the compatibilizer comprises a hydrogenated block copolymer of an alkenyl aromatic compound and a conjugated diene, a non-hydrogenated block copolymer of an alkenyl aromatic compound and a conjugated diene, or a combination thereof.

13. The composition of claim 1, comprising 0.5 to 10 weight percent of the compatibilizer, wherein the compatibilizer comprises a hydrogenated, partially hydrogenated, or non-hydrogenated block copolymer of an alkenyl aromatic compound and a conjugated diene, or a combination thereof.

14. The composition of claim 1, comprising 0.5 to 10 weight percent of the compatibilizer, wherein the compatibilizer comprises a polystyrene-poly(ethylene-butylene)-polystyrene triblock copolymer (SEBS), a polystyrene-poly(ethylene-propylene)-polystyrene triblock copolymer (SEPS), a polystyrene-poly(ethylene-ethylene/propylene)-polystyrene triblock copolymer, a polystyrene-poly(butadiene-styrene)-polystyrene triblock copolymer, a polystyrene-polyisoprene-polystyrene triblock copolymer, a polystyrene-polybutadiene-polystyrene triblock copolymer (SBS), a polystyrene-polyisoprene-polystyrene triblock copolymer (SIS), a polystyrene-polybutadiene diblock copolymer (SB), a polystyrene-polyisoprene diblock copolymer (SI), or a combination thereof.

15. The composition of claim 1, comprising 0.5 to 10 weight percent of the compatibilizer, based on the total weight of the composition, wherein the compatibilizer comprises a polystyrene-poly(ethylene-butylene)-polystyrene triblock copolymer comprising 20 to 60 weight percent polystyrene, based on the weight of the triblock copolymer, and having a weight average molecular weight of 50,000 to 100,000 atomic mass units, as measured by gel permeation chromatography.

16. The composition of claim 1, further comprising 0.02 to 1 weight percent, based on the total weight of the composition, of a polytetrafluoroethylene.

17. The composition of claim 1, further comprising 1 to 60 weight percent, based on the total weight of the composition, of a flame retardant.

18. The composition of claim 17, wherein the flame retardant comprises a metal hydroxide, a phosphoric acid salt, an organophosphate ester, a brominated organic compound, antimony trioxide, or a combination thereof.

19. The composition of claim 1, further comprising 5 to 50 weight percent, based on the total weight of the composition, of magnesium hydroxide, aluminum hydroxide, or a combination thereof.

20. A composition comprising:
  65 to 97.5 weight percent of a polyolefin selected from low density polyethylene, medium density polyethylene, and a combination thereof;
  2.5 to 25 weight percent of an oligomeric poly(phenylene ether) having an intrinsic viscosity of 0.01 to 0.12 deciliters per gram, as measured in chloroform at 25° C., selected from a monofunctional poly(2,6-dimethyl-4-phenylene ether), a bifunctional poly(2,6-dimethyl-4-phenylene ether), and a combination thereof; and
  0 to 10 weight percent of a polystyrene-poly(ethylene-butylene)-polystyrene triblock copolymer comprising 20 to 60 weight percent polystyrene content, based on the weight of the triblock copolymer, and having a weight average molecular weight of 50,000 to 100,000 atomic mass units, as measured by gel permeation chromatography;
  wherein all weight percents are based on the combined weight of the polyolefin, the poly(phenylene ether), and the polystyrene-poly(ethylene-butylene)-polystyrene triblock copolymer.

21. The composition of claim 20, comprising 0.5 to 10 weight percent of the polystyrene-poly(ethylene-butylene)-polystyrene triblock copolymer.

22. An article comprising the composition of claim 1.

* * * * *